Dec. 20, 1966 E. MANZO 3,292,284

RECORDING INDEX

Filed April 22, 1964 2 Sheets-Sheet 1

INVENTOR.
EUGENE MANZO

BY Richards & Geier

ATTORNEYS

RECORDING INDEX

Filed April 22, 1964 2 Sheets-Sheet 2

INVENTOR.
EUGENE MANZO
BY Richards & Geier
ATTORNEYS 3,292,284
Patented Dec. 20, 1966

3,292,284

RECORDING INDEX

Eugene Manzo, 6500 NW. 35th Ave., Miami, Fla.

Filed Apr. 22, 1964, Ser. No. 361,735
8 Claims. (Cl. 40—62)

This invention relates to a recording index and refers more particularly to a check-list recorder for use in performing check-off operations on aircraft, machinery, etc.

It is a common practice to perform operational and maintenance checks of systems and devices on aircraft, heavy machinery, power facilities, etc. both before and after using this equipment. Generally, the checking is done according to a predetermined sequence and by reference to a master check-off list. In this manner, the likelihood of overlooking one or more items during check-off is greatly reduced.

In conjunction with performing the various check-off items, it is essential that they be recorded as performed to obviate duplication or oversight.

It is, therefore, the primary object of the present invention to provide a recording index for recording the accomplishment of various checks of machinery, systems and devices prior to their operation.

Another object is to provide a recording index which in use may be easily indexed to provide readily visible indication of the performance of a particular item of check-off, the indexing remaining as such until changed by deliberate act of the user.

Still another object is to provide a recording index which has removable tabs for identifying the item checked thereby facilitating the use of the same recording index with a number of machines, aircraft, etc.

A further object is to provide a recording index which is simple in construction and inexpensive to manufacture.

Other objects of the present invention will become apparent in the course of the following specification.

In achieving the aforementioned objectives of the present invention, it was found advantageous to provide a recording index which has an elongated, plate-like frame having a number of parallel arranged slots extending therethrough. Buttons are slidably supported in each of the slots, each button having identification indicia thereon which is associated with an item to be checked. A backing plate is supported within the frame and underlying the buttons so that when the buttons are slid between the opposite ends of the slots, portions of the upper surface of the backing plate are visible to the viewer. The upper surface of the backing plate is divided longitudinally into two equal portions, each portion being of a different color than the other. With the bottons in one operative position at one end of the slots, the viewer will observe one colored portion of the backing plate which serves as a visual indicator that the item to be checked, as identified by its associated button, has not yet been checked out. The observer or operator then performs the check out, and records it by sliding the appropriate button to its other operative position at the opposite end of the slot. This results in a covering of the first-mentioned colored portion of the backing plate while the other colored portion, symbolizing that the check-off of the item has been performed, is uncovered. In this manner, the operator who is performing a pre-operation check-off of an aircraft, machine, vehicle, etc. can determine at a glance which items in the check list have been performed etc.

In accordance with another embodiment of the present invention the recording index may comprise an elongated, plate-like frame having a number of parallel arranged elongated recesses which receive name tabs denoting various items to be checked. The frame is further provided with a number of indicator slots arranged in spaced alignment with the corresponding recesses. The frame also includes an elongated guide slot which extends therein between the recesses and indicator slots and substantially perpendicular to the direction of the recesses. A pointer is slidably supported in the guide slot and an elongated indicator strip is slidably supported in the frame in a position underlying the indicator slots. The upper surface of the indicator strip is divided in a number of transversely directed spaces, the spaces being alternately striped two different colors. In operation, the user sets the pointer at the upper end of the guide slot wherein it is aligned alongside the first recess denoting an item to be checked. It also aligns with the corresponding indicator slot which shows one of the two colors on the indicator strip. This same color also appears through all other indicator slots at the same time, the indicator strip being held in a position to show this color by resilient means. The user then performs the item check on the machine etc. and records it by moving the pointer in the guide slot to a position alongside the next succeeding item recess. This is repeated until the last item in the check off is performed. The last recess in the frame corresponds to a completion of the check-off so that when the pointer is moved into alignment with this recess, an actuator arm on the pointer engages a post or projection on the indicator strip and slides the strip longitudinally so that the other color spaces therein align with all the indicator slots and give visual indication that the check off is completed.

The invention will appear more clearly from the following detailed description when taken in conjunction with the accompanying drawings showing by way of example, the preferred embodiments of the invention concept.

In the drawings.

Throughout the specification like reference numerals are used to indicate like parts.

Figure 1:
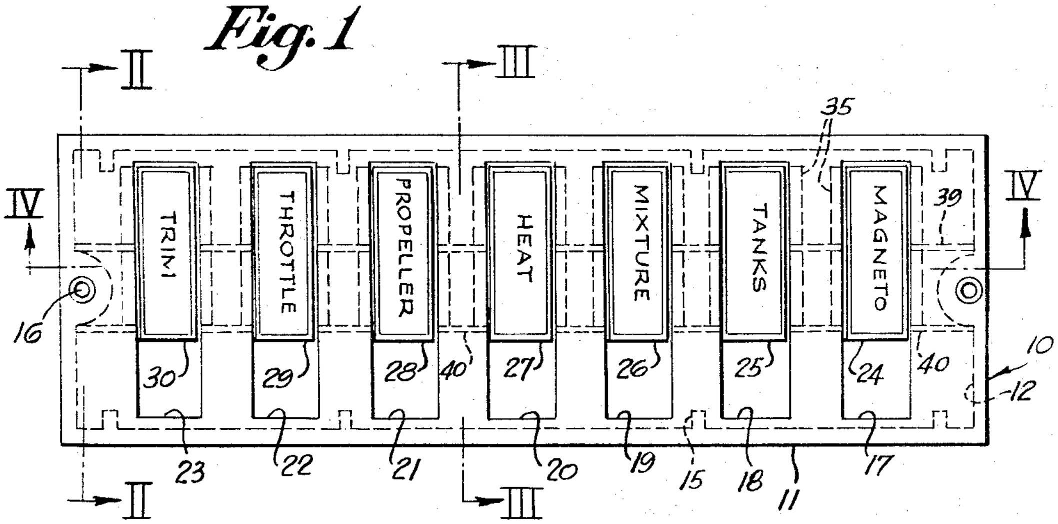
FIGURE 1 is a plan view of a recording index constructed in accordance with the principles of the present invention.

The recording index 10 illustrated in FIGURES 1 to 6 is intended for use in conjunction with a check off of aircraft, vehicles, mechanical systems, machinery, power plants, etc. As used in the specification, "check-off" is intended to include any action, inspection, adjustment or manipulation performed to and on the above-mentioned equipment prior, subsequent or incidental to its operation.

The recording index 10 comprises an elongated, regular-shaped frame 11 which is a substantially flat member and is provided with a downwardly directed skirt 12 extending around the entire periphery thereof. Peripheral skirt 12 is provided along its lower inner side with a projecting edge 13 which serves to retain backing plate or indicator strip 14 within the frame. Frame 11 is also provided with a number of spacer projections 15 which serve to keep the backing plate or indicator strip 14 properly spaced from the underside of the frame. Frame 11 is further provided with countersunk holes 16 at its ends for receiving screws (not shown) which may also be used to connect the frame with the backing plate.

Figure 4:
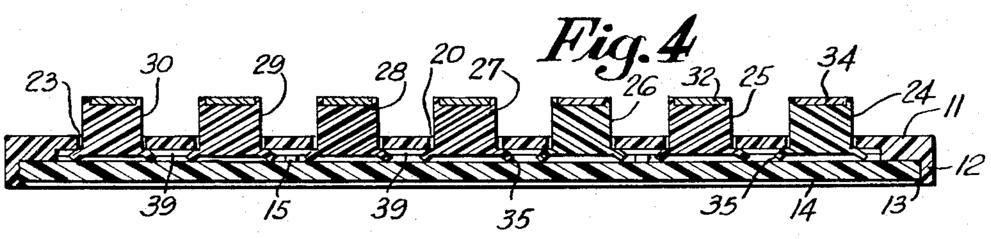
FIGURES 2, 3 and 4 are sectional views as taken along lines II—II, III—III, IV—IV respectively, in FIGURE 1.
Figure 2:
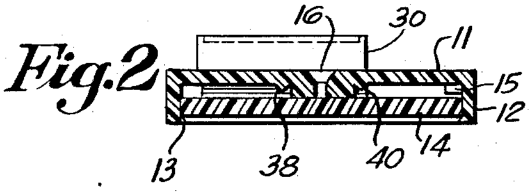
Figure 3:
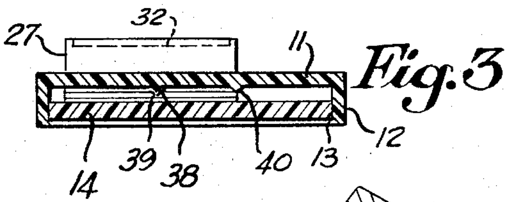
Figure 6:
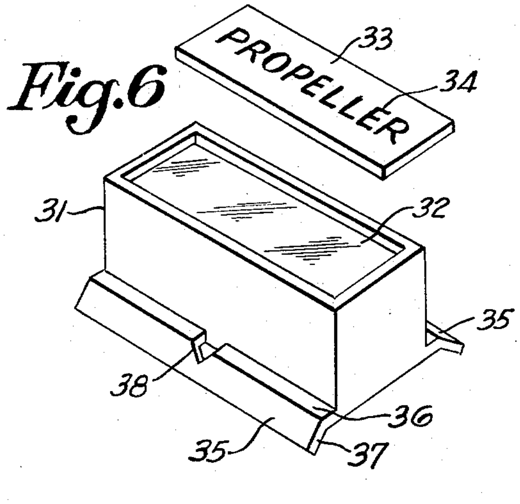
FIGURE 6 is a perspective view of one of the buttons which are slidably supported in the recording index frame.

Frame 11 is provided with a number of elongated, transversely directed, parallel spaced slots 17–23, portions of the upper surface of backing plate 14 being visible through the slots. Indicator buttons 24–30 are supported slidably in the slots 17–23 respectively. As seen in FIGURE 6, each indicator button has a block-like body 31 which has a recess 32 at the top for receiving a removable tab 33, the tab being provided with indicia 34 identifying a particular item in the check off. The lower portion of the body 31 is provided at each side with longitudinally extending fins 35, the fins having an upper flat portion 36 and a downwardly angled portion 37. The indicator buttons 24–30 are inserted in the frame 11 and through slots 17–23 prior to inserting backing plate 14 in the frame (FIG. 4). With the backing plate securely in place in the frame, the fins 35 on each button 24–30 will engage the upper surface of the backing plate. Since the fins and the entire recording index itself are made of a resilient material, preferably plastic, the fins will yield to a degree to permit the buttons to be pressed downwardly towards the backing plate. It follows then that the fins 35 normally acting like a spring, tend to force the buttons upwardly away from the backing plate 14. This facilitates providing a means for locking the buttons 24–30 when they are in their selected operative positions in the slots 17–23. Each button has two operative positions, these being when the button is slid to one or the other end of its associated slot. To lock the buttons in these operative positions, each fin 35 on the button is provided with a detent recess 38, and the undersurface of frame 11 with longitudinally directed pairs of detent projections 39 and 40 extending between adjacent slots 17–23. Since the fins tend to force the buttons upwardly of the backing plate, one or the other detent projections 39 and 40 will engage the detent recess in the button to hold it in the corresponding operative position. To slide the button in its slot to its other operative position requires that the user first depress the button to disengage the detent.

Figure 5:
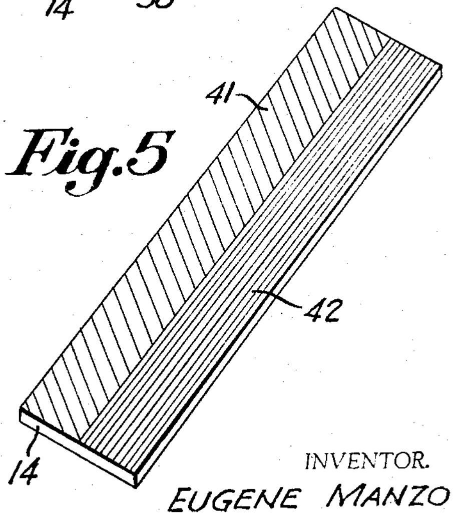
FIGURE 5 is a perspective view of the backing plate used in the recording index and illustrates the coloring of the upper surface thereof.
Figure 7:
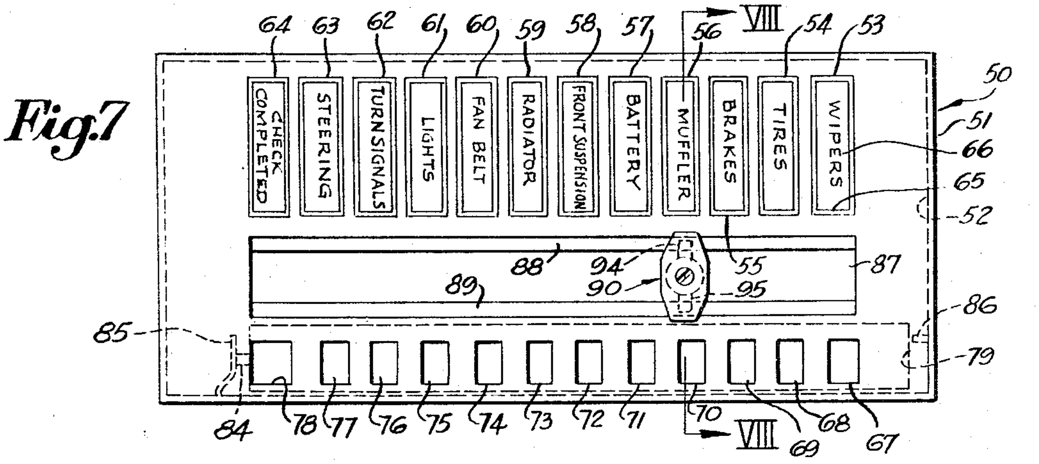
FIGURE 7 is a plan view of a different form of the recording index.
Figure 8:
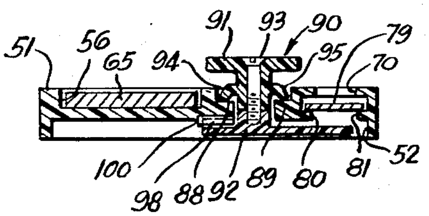
FIGURE 8 is a sectional view as taken along line VIII—VIII of FIGURE 7.
Figure 10:
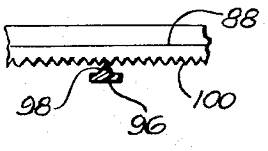
FIGURE 10 is a fragmentary view in elevation illustrating the detent means employed for locking the pointer along various locations in the frame guide slot.
Figure 9:
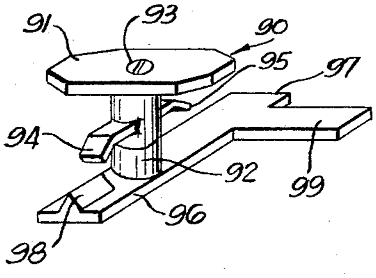
FIGURE 9 is a perspective view of the pointer used with the recording index shown in FIGURE 7.

As seen in FIGURE 5, the upper surface of backing plate 14 is divided into two colored sections, a green lefthand section 41 and a red righthand section 42. These colors may be applied to the backing plate in any known manner.

In operation:

Referring to FIGURE 1 of the drawings, the index buttons 24–30 are all shown in an up position in which position they cover the green colored surface 41 of backing plate or indicator strip 14 which otherwise would be visible through slots 17–23. On the other hand, the red colored section 42 of the backing plate is visible through the uncovered portion of the slots. In the foregoing position, the buttons 24–30 are held in the up position by reason of the detent projections 39 engaging the detent recesses 38 in fins 35 of the buttons. From the indicia 34 shown on the various buttons, it is apparent that the recording index is set up for use by an aircraft mechanic who intends to perform a preflight check of an aircraft. The mechanic will note that all the buttons 24–30 are in an up position and will see the red colored portion 42 of backing plate below the respective buttons. As he performs the various tasks of the pre-flight check, for example the check made on the "propeller," he will slide button 28 to the down position. This is done by depressing the button to disengage the detent recesses 38 thereon from the detent projections 39. After the button 28 is moved to the down position, the detent recess 38 will engage detent projections 40 and the button will remain securely locked in that (down) position. When the button 28 is moved to the down position, the red portion 42 of the backing plate which is contained within slot 21 will be covered and the green portion 41 will be exposed denoting that the particular item of the check-off has been accomplished. The remaining check-off items are likewise performed and the associated buttons moved to a down position until all items have been checked. The mechanic will then observe that all items are "green" indicating that the check off is complete. The advantage of being able to discern this information at a glance is apparent when it is considered that the check off may entail checking a hundred or more items. It should also be apparent that the recording index may be provided with any number of slots and buttons according to the number of check off items.

FIGURES 7 to 11 illustrate another form of recording index 50. In this construction, the recording index has an elongated frame 51 which is substantially flat as shown and has a downwardly directed peripheral skirt 52. The upper surface of frame 51 is provided with a number of transversely extending, parallel spaced recesses 53–64 which receive removable name tabs 65, the name tabs bearing indicia 66 indicative of the various items in the check-off. The frame is also provided with indicator slots 67–78 which are aligned with the recesses 53–64 respectively.

Figure 11:
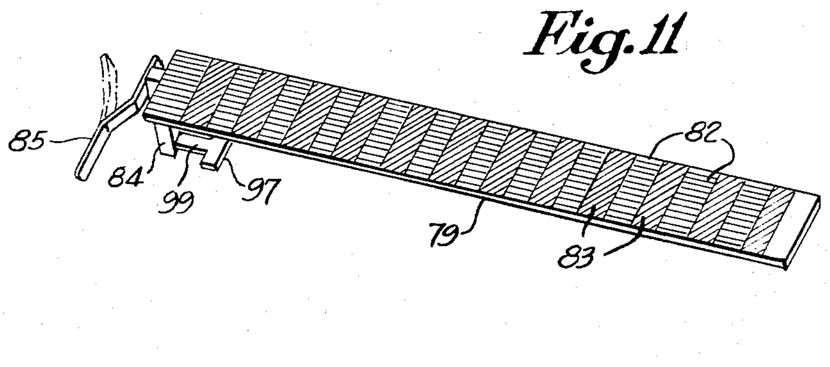
FIGURE 11 is a perspective view illustrating the construction and coloring of the indicator strip used in the recording index of FIGURE 7.

An indicator strip 79 is supported in frame 51 on slideways 80 and 81 (FIG. 8) for longitudinal sliding movement within the frame and in a position underlying the indicator slots. As seen in FIGURE 11, the upper surface of the indicator strip is divided alternatively into red colored spaces 82 and green colored spaces 83 which depending upon the position of the strip, register with the indicator slots. Indicator strip 79 is provided at one end with a post 84 which engages a leaf spring 85 supported in the frame 51. Leaf spring 85 normally exerts a sliding force on indicator strip 79 so as to force it to the right against stop 86 (FIG. 7) in which position all the red spaces 82 register with slots 67–78.

Frame 51 is also provided with an elongated guide slot 87 which extends longitudinally of the frame between the recesses and the indicator slots. The guide slot 87 has parallel shoulders 88 and 89 which support a pointer 90. Pointer 90 has a tapered upper body portion 91 which is connected to lower body portion 92 by means of a machine screw 93. Upper body portion 91 is provided with fins 94 and 95 which rest on shoulders 88 and 89 respectively, for supporting the pointer in the guide slot. The fins 94 and 95 are similar to those previously described, and yield when the pointer is depressed for disengaging the after described detent means. Lower body portion 92 is provided with wings 96 and 97, the wing 96 carrying a detent tooth 98 and the wing 97 an actuator 99 which engages post 84 for actuating indicator strip 79 (FIG. 11) in the manner to be described later on.

A portion of the frame below shoulder 88 is provided with a detent rack 100 (FIGS. 8 and 10), the teeth of the rack being engaged by detent tooth 98 on the pointer so as to constitute a detent means for locking the pointer in alignment with the various recesses 53–64.

In operation:

The recording index 50 is provided with name tabs 65 which show by way of example, that it is set up for use by an automobile mechanic who intends to perform an inspection of the vehicle. The mechanic sets point 90 alongside recess 53 carrying a tab denoting "wipers." This is done by pressing down on the pointer to unlock detent 98, 100 and sliding the pointer to its appropriate location. When the pressure on the pointer is relaxed, the fins 94 and 95 which yields to pressure, return to their original shape (FIG. 8) and the detent is once again locked. When the pointer 50 is positioned alongside recess 53, the corresponding indicator slot 67 will show red on the indicator strip 79. The mechanic then performs the check off of the "wipers." He now moves the pointer to the next recess which denotes "tires." This check is performed and the pointer moved to alignment with the next recess. This is repeated until all items have been checked off except the item denoted "check completed" on the tab in recess 64. At this point the indicator slots 67–78 still show red. When however, the mechanic now moves the pointer into alignment with recess 78, the actuator 99 carried on wing 97 of the pointer engages post 84 so that the indicator strip 79 is moved longitudinally of its own axis a distance of one space so that now, all the green spaces 83 register with the indicator slots 67–78 and indicates visually to the mechanic that the check off is completed. Spring 85 yields to the movement of the indicator strip as shown in dashed lines in FIGURE 11, and the detent means holding the pointer in place alongside recess 64, insures that the indicator strip will not be moved back to a position wherein the red spaces show. To recycle the index for future use, the pointer is once again moved to the first recess in the check list (recess 53) and the spring 85 will slide the indicator strip back to its first position (red spaces showing) against stop 86.

It should be apparent from the foregoing that recording index 50 is intended for use when the check-off is to be performed in predetermined sequence and that it is necessary to follow that sequence in order to achieve a "green signal" indicating that the check off has been carried out and carried out properly.

While there is disclosed but some embodiments of the recording index of the present invention it is possible to produce still other embodiments without departing from the scope of the inventive concept herein disclosed.

What is claimed is:

1. A device for recording information, said device comprising:
- an elongated substantially flat frame member, said frame member having a plurality of transversely directed slots extending therethrough, and a downwardly directed skirt extending around the periphery of said frame, said skirt having an inwardly projecting lower edge;
- a plurality of block-shaped buttons;
- means supporting said buttons for sliding movement in said slots,
  - said buttons being movable in said slots between operative positions at each end of said slots, each of said buttons having indicia thereon which is associated with the information to be recorded; and
- an elongated indicator strip extending longitudinally of said frame under said slots and supported on the lower edge of said skirt, said strip having at least two different, longitudinally directed colored portions thereon, each of said buttons covering one of the colored portions of said strip underlying its associated slot when the button is in one of its operative positions, each button in its other operative position covering the other colored portion of said strip underlying its associated slot, the means supporting said buttons comprises,
- fins connected with said buttons and extending longitudinally of the bottom thereof and between said frame and said indicator strip,
- a detent recess located in each of said fins; and
- parallel, longitudinal directed detent projections carried by said frame and extending between said slots, said detent recess an said detent projections constituting detent means for locking said buttons in their operative positions.

2. A device for recording information in accordance with claim 1 wherein:
- said fins are of resilient construction and elastically deform when said buttons are depressed in the direction of said indicator strip.

3. A device for recording information, said device comprising:
- an elongated, substantially flat frame member, said frame member having a plurality of elongated, transversely directed recesses therein, and separate indicator slots aligned with and spaced from each recess;
- tabs removably supported in each of said recesses, said tabs having indicia thereon which is associated with the information to be recorded;
- an elongated guide slot extending longitudinally through said frame member and located between said recesses and said indicator slots;
- a pointer slidably supported in said guide slot and movable longitudinally in said guide between aligned indicator slots and recesses;
- an elongated indicator strip slidably supported in said frame member and extending longitudinally of said frame member under said indicator slots, said indicator strip having a plurality of transversely directed colored spaces thereon, alternate spaces of said plurality of colored spaces being of the same color, the spaces of one color normally registering with said indicator slots; and
- means for longitudinally displacing said indicator strip to bring the other colored spaces thereon into register with said indicator slots,

4. A device for recording information in accordance with claim 3 wherein said means for longitudinally displacing the indicator strip comprises:
- a post carried by said strip at one end; and
- an actuator carried by said pointer, said actuator engaging said post and sliding said strip when said pointer is slid to one end of said guide slot.

5. A device for recording information in accordance with claim 3 further comprising:
- resilient means carried by said frame member and engaging said indicator strip, said resilient means acting on said strip to maintain said strip in a position wherein all the spaces of the first-mentioned one color register with said indicator slots.

6. A device for recording information in accordance with claim 3 wherein:
- said indicator strip has a plurality of alternately arranged red colored spaces therein, and green colored spaces extending between said red colored spaces.

7. A device for recording information in accordance with claim 3 further comprising:
- detent means for locking said pointer in its operative positions along side each recess.

8. A device for recording information in accordance with claim 7 wherein said detent means comprises:
- a detent rack carried by said frame member adjacent said guide slot, and a detent tooth carried by said pointer, said detent tooth engaging said detent rack.

References Cited by the Examiner

UNITED STATES PATENTS

| | | | |
|---|---|---|---|
| 499,517 | 6/1893 | Carrington | 40—62 |
| 1,008,481 | 11/1911 | Lopes | 116—135 X |
| 1,235,737 | 8/1917 | Sullivan | 40—62 |
| 1,977,342 | 10/1934 | Maddingan | 40—64 |
| 2,146,005 | 2/1939 | Bernholz | 116—135 |
| 2,460,549 | 2/1949 | Stiles | 116—135 |
| 2,865,113 | 12/1958 | King | 116—135 X |

FOREIGN PATENTS

| | | |
|---|---|---|
| 530,996 | 10/1956 | Canada. |
| 1,256,445 | 2/1961 | France. |

EUGENE R. CAPOZIO, *Primary Examiner.*

H. F. ROSS, *Assistant Examiner.*